United States Patent [19]

Gelfand et al.

[11] 4,416,394

[45] Nov. 22, 1983

[54] REGULATING APPARATUS FOR AUTOMATICALLY CONTROLLING THE PRODUCTION OF A COMMINUTED MIXTURE HAVING PRESCRIBED COMPOSITION

[75] Inventors: Yakov E. Gelfand; Marina L. Komova, both of Leningrad; Eduard G. Shtengel, Pushkin; Leonid M. Yakovis, Leningrad, all of U.S.S.R.

[73] Assignee: Vsesojuzny Nauchno-issledovatelsky i proektno-konstruktorsky institut po avtomatizatsil predpriyaty promyshlennosti stroitelnykh materialov, Leningrad, U.S.S.R.

[21] Appl. No.: 294,793

[22] Filed: Aug. 20, 1981

[51] Int. Cl.³ .............................................. B67D 5/08
[52] U.S. Cl. ........................................ 222/55; 222/71; 222/132; 222/134; 241/34; 364/469
[58] Field of Search ................. 222/52, 55, 56, 63, 222/129, 132, 134, 135, 145, 71; 364/468, 469, 579; 241/33, 34

[56] References Cited

U.S. PATENT DOCUMENTS 3,194,546 7/1965 Schuerger et al. ............... 222/55
3,245,584 4/1966 Linville ........................... 222/132
3,421,703 1/1969 Galer ............................... 241/34

Primary Examiner—Joseph J. Rolla
Assistant Examiner—Kevin P. Shaver
Attorney, Agent, or Firm—Fleit, Jacobson, Cohn & Price

[57] ABSTRACT

A regulating apparatus for automatically controlling the production of a comminuted mixture having prescribed composition out of big-sized starting materials, comprising starting material flow meters responsive to the rates of flow of the starting materials, a plurality of multiplying devices each having its one input connected to the output of a flow meter responsive to the rate of flow of the comminuted mixture and its other input connected to the corresponding output of a means for determining the concentrations of the controlled components in the comminuted mixture, and a plurality of subtraction devices each having its one input directly connected to the corresponding starting material flow meter and its other input connected to the same flow meter through a delay unit and an a periodic unit. The apparatus further comprises a plurality of adders each having its one input connected through an integrator to the output of the corresponding multiplying device and its other inputs respectively connected through other integrators to the outputs of the subtraction devices. The outputs of the adders are connected to the inputs of the control means for adjusting metering devices which dispense the starting materials.

1 Claim, 1 Drawing Figure

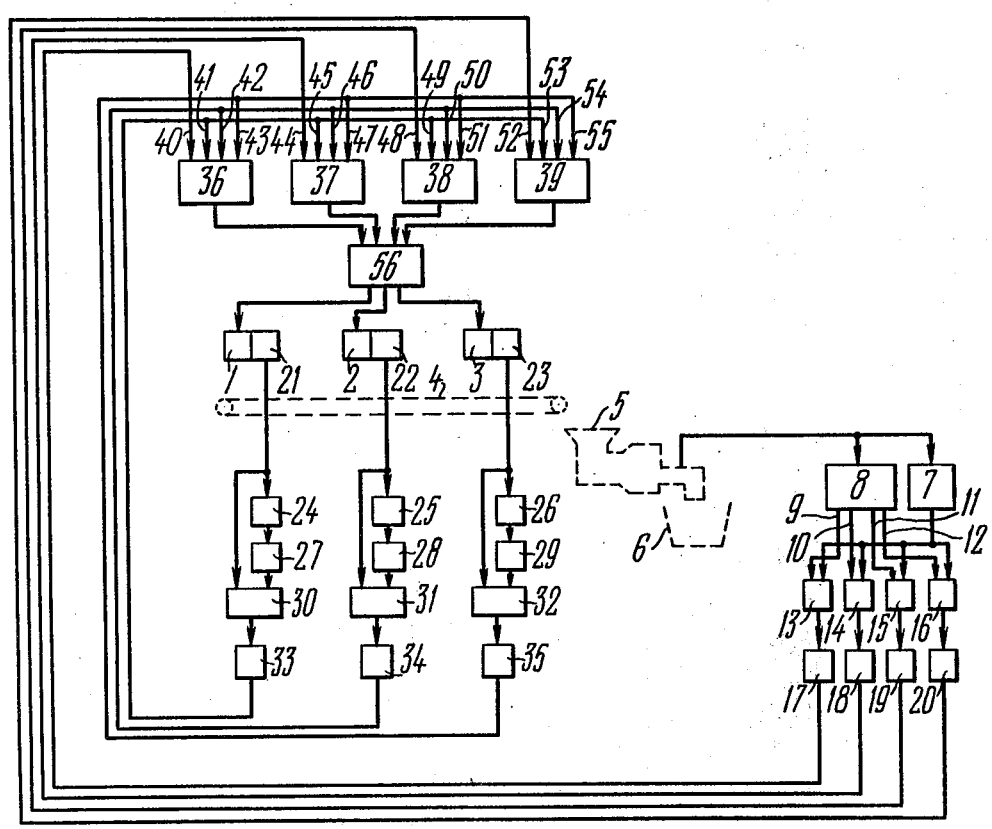

REGULATING APPARATUS FOR AUTOMATICALLY CONTROLLING THE PRODUCTION OF A COMMINUTED MIXTURE HAVING PRESCRIBED COMPOSITION

FIELD OF THE INVENTION

The present invention relates to automatic control devices, and more particularly to regulating apparatuses for automatically controlling the production of a comminuted mixture having prescribed composition.

The present invention can most advantageously be used in production of building materials for automatically controlling the production of cement raw mixture.

DESCRIPTION OF THE PRIOR ART

In the process of producing a comminuted mixture out of big-sized starting materials it is impossible to check variation of the composition of such materials because of different composition of different lumps. Therefore, to maintain the prescribed composition of the produced mixture it is necessary to check the composition of the comminuted mixture so as to change accordingly the proportion of starting materials supplied to the comminution device upon deviation of the mixture composition from the prescribed composition.

Known in the art is a regulating apparatus for automatically controlling the production of a comminuted mixture having prescribed composition made of big-sized starting materials, comprising metering devices for dispensing the starting materials, a comminuted mixture flow meter responsive to the rate of flow of the mixture leaving the comminution device, a composition determining means for developing at its outputs signals respectively proportional to the concentrations of the controlled components in the mixture leaving the comminution device, a control means for adjusting the metering devices, and a plurality of circuits each comprising a multiplying device having its one input connected to the comminuted mixture flow meter and an integrator having its input connected to the output of the multiplying device, the number of said circuits being equal to the number of the controlled components, said circuits being respectively coupled to the outputs of the composition determining means so that another input of the multiplying device of each circuit is connected to the corresponding output of the composition determining means (cf. S. I. Daniushevsky et al. "The Principles of Technology for the Production of Portland Cement Raw Mixtures", Leningrad, 1971, pp. 104–105). In this apparatus the outputs of the integrators of said plurality of circuits are connected to the inputs of the control means. The signal supplied from the output of each integrator to the corresponding input of the control means is proportional to the quantity of one of the controlled components in the produced mixture. The control means adjusts the outputs of the metering devices in accordance with deviation of the actual composition of the mixture being produced from the prescribed composition.

Thus, in the known regulating apparatus adjustment of the metering devices is carried out with regard only to the composition of the produced mixture. Therefore, the control means adjusting the metering devices responds to variations in the rate of flow of each starting material with a time lag caused by the passage of the metered starting materials through the technological path, i.e. from the metering devices to the comminution device and through the comminution device. This results in a great dynamic error of regulation and leads to great deviations of the actual composition of the produced mixture from the prescribed compositions.

SUMMARY OF THE INVENTION

Accordingly, it is an object of the present invention to provide a regulating apparatus for automatically controlling the production of a comminuted mixture having prescribed composition out of big-sized starting materials, which ensures reduction in deviations in the composition of the produced mixture.

Another object of the present invention is to provide a regulating apparatus for automatically controlling the production of a comminuted mixture having prescribed composition out of big-sized starting materials, which ensures quick response to variation in the rate of flow of the starting materials by providing compensation for the time lag caused by the passage of the metered materials through the technological path.

With these and other objects in view, there is provided a regulating apparatus for automatically controlling the production of a comminuted mixture having prescribed composition out of big-sized starting materials, comprising metering devices for dispensing the starting materials, a comminuted mixture flow meter responsive to the rate of flow of the mixture leaving the comminution device, a composition determining means for developing at its outputs signals respectively proportional to the concentrations of the controlled components in the mixture leaving the comminution device, a control means for adjusting the metering devices, and a plurality of circuits each comprising a multiplying device having its one input connected to the comminuted mixture flow meter and an integrator having its input connected to the multiplying device, the number of said circuits being equal to the number of the controlled components, said circuits being respectively coupled to the outputs of the composition determining means, which regulating apparatus, according to the invention, further comprises starting material flow meters respectively responsive to the rates of flow of the metered starting materials, a plurality of adders, the number of said adders being equal to the number of the controlled components, said adders being respectively coupled to the circuits of said plurality of circuits so that one input of each of the adders is connected to the output of the integrator of the corresponding circuit, and being respectively coupled to the inputs of the control means so that the output of each adder is connected to the corresponding input of the control means, a second plurality of circuits comprising each a delay unit and an aperiodic unit connected in series, a subtraction device, and an integrator having its input connected to the output of the subtraction device, the number of the circuits of said second plurality of circuits being equal to the number of the metered starting materials, and the circuits of said second plurality of circuits being respectively coupled to the starting material flow meters so that one input of the subtraction device of each circuit is connected to the corresponding starting material flow meter, while the delay unit and the aperiodic unit of each circuit are connected between the corresponding starting material flow meter and another input of the subtraction device. The proposed regulating apparatus provides for adjustment of the metering devices not only with regard to variation in the produced mixture composition but also with regard to the composition of the mixture passing through the technological path and thus ensures compensation for the time lag caused by the passage of the materials through the technological path. This leads to reduction in deviations of the produced mixture composition.

The invention is further explained by a detailed description of its preferred embodiment with reference to the accompanying drawing which shows a block-diagram of a regulating apparatus for automatically controlling the production of a comminuted mixture, according to the invention.

DETAILED DESCRIPTION OF THE INVENTION

The regulating apparatus shown in the drawing is intended for controlling the production of a comminuted mixture out of three big-sized starting materials X, Y and Z. The prescribed composition of the mixture is defined by a prescribed proportion of four controlled components A, B, C and D.

Referring to the drawing, the regulating device for automatically controlling the production of a comminuted mixture having prescribed composition comprises metering devices 1, 2 and 3 for dispensing starting materials X, Y and Z, respectively. The metering devices 1, 2 and 3 may be belt scales having adjustable belt speeds. The metering devices 1, 2 and 3 are positioned above a conveyor 4 which serves to deliver the metered starting materials to the receiving hopper of a comminution device 5 which may be a ball mill, an attrition mill, or the like. The mixture leaving the comminution device 5 is fed into a storage container 6.

The regulating apparatus further comprises a flow meter 7 responsive to the rate of flow of the comminuted mixture and positioned at the output of the comminution device 5, and a composition determining means 8 which is similarly positioned and is responsive to the chemical composition of the comminuted mixture leaving the comminution device 5. The composition determining means 8 includes an X-ray spectrum analyser (not shown) and means (not shown) for selecting and delivering a sample of the mixture to the analyser. The composition determining means 8 has four outputs 9, 10, 11 and 12. The regulating apparatus further comprises multiplying devices 13, 14, 15 and 16, and integrators 17, 18, 19 and 20. The inputs of the integrators 17, 18, 19 and 20 are respectively connected to the outputs of the multiplying devices 13, 14, 15 and 16. One input of each of the multiplying devices 13, 14, 15 and 16 is connected to the output of the flow meter 7. The other inputs of the multiplying devices are respectively connected to the outputs of the composition determining means 8.

The regulating apparatus is further provided with flow meters 21, 22 and 23 responsive to the rates of flow of the starting materials and respectively associated with the metering devices 1, 2 and 3 and comprises also delay units 24, 25 and 26, aperiodic units 27, 28 and 29, subtraction devices 30, 31 and 32, and integrators 33, 34 and 35. The input of the delay unit 24 and one input of the subtraction device 30 are connected to the flow meter 21, the input of the delay unit 25 and one input of the subtraction device 31 are connected to the flow meter 22, the input of the delay unit 26 and one input of the subtraction device 32 are connected to the flow meter 23. The outputs of the delay units 24, 25 and 26 are respectively connected to the inputs of the aperiodic units 27, 28 and 29 whose outputs are respectively connected to the other inputs of the subtraction devices 30, 31 and 32. The outputs of the subtraction devices 30, 31 and 32 are respectively connected to the inputs of the integrators 33, 34 and 35. Each of the delay units 24, 25 and 26 provides an output signal which varies in the same way as its input signal but is delayed in relation to the latter for a time period determined by the parameters of the delay unit. Such a delay unit may be, for example, a delay line or a magnetic recording device having its recording and reproducing heads spaced at a predetermined distance. The relationship between the output signal produced by each of the aperiodic units 27, 28 and 29 and its input signals corresponds to the exponential law. Such an aperiodic unit may be, for example, an integrating RC-network.

The regulating apparatus further comprises adders 36, 37, 38 and 39 each having four inputs. The inputs 40, 41, 42 and 43 of the adder 36 are respectively connected to the outputs of the integrators 17, 33, 34 and 35. The inputs 44, 45, 46 and 47 of the adder 37 are respectively connected to the outputs of the integrators 18, 33, 34 and 35. The inputs 48, 49, 50 and 51 of the adder 38 are respectively connected to the outputs of the integrators 19, 33, 34 and 35. The inputs 52, 53, 54 and 55 of the adder 39 are respectively connected to the outputs of the integrators 20, 33, 34 and 35. The outputs of the adders 36, 37, 38 and 39 are respectively connected to the inputs of the control means 56 for adjusting the metering devices, the outputs of the control means 56 being respectively connected to the control inputs of the metering devices 1, 2 and 3.

The regulating apparatus operates as follows.

When the starting materials are fed from the metering devices 1, 2 and 3 to the conveyor 4, the flow meters 21, 22 and 23 produce signals respectively proportional to the rates of flow of materials X, Y and Z. The signals from the flow meters 21, 22 and 23 are applied to the inputs of the subtraction devices 30, 31 and 32, the other inputs of the subtraction devices 30, 31 and 32 being supplied with signals from the flow meters 21, 22 and 23 via the delay unit 24 and the aperiodic unit 27, the delay unit 25 and the aperiodic unit 28, the delay unit 26 and the aperiodic unit 29, respectively.

In the course of production of the comminuted mixture a variation in the flow rate of a starting material will not immediately lead to variation in the composition of the mixture leaving the comminution device 5. This variation in mixture composition will take place with a time lag caused by the passage of the starting materials through the technological path, i.e. through the conveyor 4 and the comminution device 5. This time lag is determined, firstly, by the interval between the time when a portion of a starting material is delivered to the conveyor 4 and the time when first grains of said portion appear at the output of the comminution device 5, and, secondly, to the inertia of the comminution device 5 as a result of which inertia, after the first grains of the portion of the material fed into the comminution device 5 appear at its output, the quantity of the comminuted material will increase gradually, according to a relationship which can be approximated by an exponential law.

The parameters of the delay units 24, 25 and 26 are chosen so as to provide delay times equal to the time periods after which changes in the flow rates of the starting materials respectively metered by the metering devices 1, 2 and 3 are followed by the instants at which the composition of the mixture leaving the comminution device 5 begins to vary in result of said changes in the flow rates. The parameters of the aperiodic units 27, 28 and 29 are so chosen that their time constants are respectively equal to the time constants of the comminution device 5 for materials X, Y and Z. Therefore the electric signals produced by the meters 21, 22 and 23 appear at the outputs of the aperiodic units 27, 28 and 29 with the same time lags, respectively, with which portions of materials X, Y and Z metered by the metering devices 1, 2 and 3 appear at the output of the comminution device 5. Thus, the subtraction device 30, 31 and 32 perform subtraction of the signals respectively proportional to the flow rates of materials X, Y and Z fed at a given instant to the conveyor 4, and the signals proportional to the flow rates of these materials leaving at this instant in a granulated state the comminution device 5. Hence, the output signals developed by the subtraction devices 30, 31 and 32 are proportional to the instant changes in the quantities of the corresponding materials present in the technological path. These signals are then integrated by the integrators 33, 34 and 35 with the result that the signals developed at their outputs are respectively proportional to the quantities of materials X, Y and Z in the technological path.

The comminuted mixture leaving the comminution device 5 is sampled and its composition is analysed by the X-ray spectrum analyser, whereby signals are developed at the outputs 9, 10, 11 and 12 of the composition determining means 8 which are respectively proportional to the concentrations of the controlled components A, B, C and D in the mixture passing from the comminution device 5 to the storage container 6. These signals are applied to the inputs of the multiplying devices 13, 14, 15 and 16. The flow meter 7 produces a signal corresponding to the amount of mixture fed in a unit time from the comminution device 5 into the storage container 6. This signal is applied to the other inputs of the multiplying devices 13, 14, 15 and 16. As a result, the signals developed at the outputs of the multiplying devices 13, 14, 15 and 16 are respectively proportional to the quantities of components A, B, C and D fed in a unit time from the comminution device 5 into the container 6. These signals are integrated by the integrators 17, 18, 19 and 20 with the result that the signals developed at their outputs are respectively proportional to the quantities of components A, B, C and D accumulated in the container 6.

The signals from the integrators 17, 18, 19 and 20 are respectively applied to the input 40 of the adder 36, to the input 44 of the adder 37, to the input 48 of the adder 38 and to the input 52 of the adder 39. The inputs 41, 45, 49 and 53 of the adders 36, 37, 38 and 39 are supplied with a signal from the integrator 33 which is proportional to the quantity of material X in the technological path. The inputs 42, 46, 50 and 54 of the adders 36, 37, 38 and 39 are supplied with a signal from the integrator 34 which is proportional to the quantity of component Y in the technological path. The inputs 43, 47, 51 and 55 of the adders 36, 37, 38 and 39 are supplied with a signal from the integrator 35 which is proportional to the quantity of material Z in the technological path. The parameters of the adders 36, 37, 38 and 39 are so chosen that the transfer factors of the adder 36 across its inputs 41, 42 and 43 are respectively proportional to the average values of concentration of the component A in materials X, Y and Z, the transfer factors of the adder 37 across its inputs 45, 46 and 47 are respectively proportional to the average values of concentration of the component B in materials X, Y and Z, the transfer factors of the adder 38 across its inputs 49, 50 and 51 are respectively proportional to the average values of concentration of the component C in materials X, Y and Z, and the transfer factors of the adder 39 across its inputs 53, 54 and 55 are respectively proportional to the average value of concentration of the component D in materials X, Y and Z. The average values of concentration of said components in the starting materials are determined in advance by repeatedly sampling and analysing lumps of the starting materials over a sufficiently long period of time (e.g., for several months) and by subsequently averaging the obtained results. The transfer factors of the adders 36, 37, 38 and 39 across the inputs 40, 44, 48 and 52 are chosen according to the scales of the signals at the outputs of the integrators 17, 18, 19, 20, 33, 34 and 35.

The signals developed at the outputs of the adders 36, 37, 38 and 39 are respectively proportional to the total quantities of the components A, B, C and D present both in the storage container 6 and the technological path. These signals are supplied to the corresponding inputs of the control means 56 wherein the ratio of said total quantities of the components is compared to the ratio corresponding to the prescribed composition. In case of deviation of the actual ratio of the components from the prescribed ratio the control means 56 develops output signals which cause the metering devices 1, 2 and 3 to adjust their outputs so as to eliminate said deviation by suitably altering the ratio of the metered materials. The control means 56 may be a computing device capable of solving the problem of nonlinear programming.

Thus the signals controlling the operation of the metering devices 1, 2 and 3 developed at the outputs of the control means 56 represent not only variations in the composition of the produced mixture but also variations in the composition of the mixture in the technological path caused by variations in the outputs of the metering devices 1, 2 and 3. As a result, variations in the outputs of the metering devices are taken into account immediately, before they affect the composition of the produced mixture, which ensures smaller deviations in the produced mixture composition.

We claim:

1. A regulating apparatus for automatically controlling the production of a comminuted mixture out of big-sized starting materials by means of a comminution device, said comminuted mixture having a prescribed concentration of controlled components, said apparatus comprising:

metering devices for dispensing said starting materials, each of said metering devices having a control input;

a plurality of starting material flow meters equal in number to the number of said starting materials, said starting material flow meters being respectively responsive to the rates of flow of the starting materials metered by said metering devices;

a comminuted mixture flow meter responsive to the rate of flow of the mixture leaving said comminution device;

a composition determining means having a plurality of outputs equal in number to the number of said controlled components for developing at said outputs signals respectively proportional to the concentrations of said controlled components in the mixture leaving said comminution device;

a plurality of multiplying devices equal in number to the number of said controlled components and each having a first input, a second input and an output, said first inputs of said multiplying devices being connected to said comminuted mixture flow meter and said second inputs of said multiplying devices being respectively connected to said outputs of said composition determining means;

a first plurality of integrators equal in number to the number of said controlled components and each having an input and an output, said inputs of the integrators of said first plurality of integrators being respectively connected to said outputs of said multiplying devices;

a plurality of circuits equal in number to the number of said starting materials and each including a delay unit and an aperiodic unit and having an input and an output, said inputs of said circuits being respectively connected to said starting material flow meters;

a plurality of subtraction devices equal in number to the number of said starting materials and each having a first input, a second input and an output, said first inputs of said subtraction devices being respectively connected to said starting material flow meters and said second inputs of said subtraction devices being respectively connected to said outputs of said circuits;

a second plurality of integrators equal in number to the number of said starting materials and each having an input and an output, said inputs of the integrators of said second plurality of integrators being respectively connected to said outputs of said subtraction circuits;

a plurality of adders equal in number to the number of said controlled components and each having a plurality of inputs equal in number to the number of said starting materials, an additional input, and an output, the inputs of said plurality of inputs of each of said adders being respectively connected to said outputs of the integrators of said second plurality of integrators and said additional inputs of said adders being respectively connected to said outputs of the integrators of said first plurality of integrators; and a control means for adjusting said metering devices and having a plurality of inputs equal in number to the number of said controlled components and a plurality of outputs equal in number to the number of said starting materials, said inputs of said control means being respectively connected to said outputs of said adders and said outputs of said control means being respectively connected to said control inputs of said metering devices.

* * * * *